US007824760B2

(12) United States Patent
Mochizuki et al.

(10) Patent No.: US 7,824,760 B2
(45) Date of Patent: Nov. 2, 2010

(54) INTERMEDIATE TRANSFER MEMBER, METHOD OF PRODUCING THE SAME, IMAGE FORMING METHOD AND IMAGE FORMING APPARATUS

(75) Inventors: Fumitaka Mochizuki, Tokyo (JP); Ichiro Kudo, Mitaka (JP); Yuichiro Maehara, Hino (JP); Masahiko Kurachi, Hino (JP); Kenji Sakka, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 978 days.

(21) Appl. No.: 11/646,785

(22) Filed: Dec. 28, 2006

(65) Prior Publication Data

US 2007/0188585 A1 Aug. 16, 2007

(30) Foreign Application Priority Data

Feb. 13, 2006 (JP) ......................... JP2006-034840

(51) Int. Cl.
*B32B 7/06* (2006.01)
*B32B 7/02* (2006.01)
*G03G 13/16* (2006.01)
*G03G 15/00* (2006.01)
*G03G 15/01* (2006.01)
*G03G 15/20* (2006.01)

(52) U.S. Cl. .................. 428/200; 428/217; 430/125.32; 399/159; 399/302; 399/303; 399/308; 399/312; 399/313

(58) Field of Classification Search ....................... None
See application file for complete search history.

(56) References Cited

U.S. PATENT DOCUMENTS

| | | | | |
|---|---|---|---|---|
| 5,709,936 | A * | 1/1998 | Besmann et al. | 428/323 |
| 5,807,651 | A * | 9/1998 | Rimai et al. | 430/11 |
| 6,393,226 | B1 * | 5/2002 | Charlebois et al. | 399/12 |
| 7,488,563 | B2 * | 2/2009 | Rimai et al. | 430/123.51 |
| 7,504,276 | B2 * | 3/2009 | Hasebe et al. | 438/53 |

FOREIGN PATENT DOCUMENTS

| | | |
|---|---|---|
| JP | 11-231684 | 8/1999 |
| JP | 2001-242725 | 9/2001 |
| JP | 2002-311720 | 10/2002 |
| JP | 2002-365937 | 12/2002 |

* cited by examiner

*Primary Examiner*—Sheeba Ahmed
(74) *Attorney, Agent, or Firm*—Cantor Colburn LLP

(57) ABSTRACT

Provided is an intermediate transfer member, a method of producing the same, and an image forming method and an image forming apparatus thereof having excellent effects such that neither crack nor rupture is generated upon repetitive use, no transferring ratio drops during secondary transfer, and neither white patch of an text image nor white patch of a solid image is generated. Also disclosed is an intermediate transfer member used for an image forming apparatus, wherein a surface of the intermediate transfer member has a hardness of 1.5-3.0 GPa, measured by a nano indentation method, and a hardness of 0.15-0.45 GPa, specified by a universal hardness method.

18 Claims, 6 Drawing Sheets

INTERMEDIATE TRANSFER MEMBER, METHOD OF PRODUCING THE SAME, IMAGE FORMING METHOD AND IMAGE FORMING APPARATUS

TECHNICAL FIELD

The present invention relates to an intermediate transfer member, a method of producing the same, and an image forming method and an image forming apparatus thereof.

BACKGROUND

As an image forming method to obtain a high quality toner image via high speed image formation, there is a method of forming an image through the steps of developing an electrostatic latent image on an electrostatic latent image carrier with toner supplied by a developing roller; and transferring a formed toner image onto a transfer material such as a paper sheet and the like via a member such as an intermediate transfer member.

Excellent toner transferability from an electrostatic latent image carrier to an intermediate transfer member, and further from the intermediate transfer member to a transfer material, and also a cleaning performance to clean the remaining toner after transferring are desired for the intermediate transfer member employed in this image forming method.

In order to obtain the excellent toner transferability from an intermediate transfer member to a transfer material, disclosed is a technique of controlling resistance by containing a conductive material such as carbon black in an intermediate transfer member (refer to Patent Document 1, for example).

Also disclosed is a technique of controlling resistance of the intermediate transfer member surface by containing a conductive agent providing electron conductivity onto a surface layer of the intermediate transfer member (refer to Patent Document 1, for example).

In the case of a number of prints printed employing this intermediate transfer member, the secondary transfer performance concerning a transferring process from an intermediate transfer member to a transfer material is to be degraded.

In order to avoid degradation of secondary transfer performance, it is tried to introduce a surface potential detecting device installed in an image forming apparatus (refer to Patent Document 2, for example).

This is a method in which a surface potential detecting device to detect the potential on the back surface of the intermediate transfer member at a point between the primary transfer position and the secondary transfer position is provided in order to solve the problem concerning the degradation of the secondary transfer performance.

However, there was a problem such that the method of installing a surface potential detecting device in an image forming apparatus led could cost a lot more.

In order to provide an intermediate transfer member exhibiting both the excellent first and second transfer ability, together with excellent durability, it is tried to utilize polyurethane used for a member composed of the surface brought into contact with toner (surface layer), (refer to Patent Document 3, for example).

As for the above-described polyurethane, the constitution polyol is polyolefin based polyol, and the foregoing polyol is one in which dimmer acid based polyol having a hydroxyl group terminal is blended, or not blended Also disclosed is an image forming apparatus exhibiting excellent secondary transferability, fitted with an intermediate transfer member capable of avoiding generation of image defects such as text image hollow defects and the like (refer to Patent Document 4, for example).

It is specifically reported that a material having the surface of low surface energy is obtained by combining a resin material exhibiting an excellent mechanical characteristic with low surface energy powder and a conductive agent and further dispersing them, and the resulting material is employed as an intermediate transfer member to accomplish the foregoing statement.

(Patent Document 1) Japanese Patent O.P.I. Publication No. 2001-242725

(Patent Document 2) Japanese Patent O.P.I. Publication No. 2002-365937

(Patent Document 3) Japanese Patent O.P.I. Publication No. 2002-311720

(Patent Document 4) Japanese Patent O.P.I. Publication No. 11-231684

However, an intermediate transfer member with polyurethane, or an intermediate transfer member obtained by combining a resin material exhibiting an excellent mechanical characteristic with low surface energy powder and a conductive agent and further dispersing them was not capable of acquiring excellent secondary transferability continuously with no rapture even though it was repeatedly used.

SUMMARY

It is an object of the present invention to provide a new and useful for an image forming apparatus. In particular, an intermediate transfer member in which neither crack nor rupture is generated upon repetitive use, no secondary transferring ratio drops, and neither white patch of a text image nor white patch of a solid image is generated. Disclosed is an intermediate transfer member employed in an image forming apparatus which primarily transfers a toner image carried on an electrostatic latent image carrier onto the intermediate transfer member, and secondarily transfers the primarily transferred toner image from the intermediate transfer member to a transfer material, wherein a surface of the intermediate transfer member has a hardness of 1.5-3.0 GPa measured by a nano indentation method, and a hardness of 0.15-0.45 GPa specified by a universal hardness method.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DETAILED DESCRIPTION

The inventors have studied the relationship between hardness of the surface of an intermediate transfer member as specified by universal hardness and secondary transferability.

After considerable effort during intensive studies, the inventors have found out that an excellent transferring ratio can be obtained during secondary transfer, and an excellent toner image in which neither white patch of an text image nor white patch of a solid image is generated can also be obtained by employing an intermediate transfer member having a specific value of hardness specified by universal hardness.

However, there is a problem produced such that an intermediate transfer member is ruptured during repetitive use, when the surface hardness specified by universal hardness is hardened in order to obtain an excellent transferring ratio during secondary transfer.

The inventors have further studied an intermediate transfer member, a method of producing the same, and an image forming method and an image forming apparatus thereof in which neither crack nor rupture is generated upon repetitive use, an excellent transferring ratio is obtained during secondary transfer, and neither white patch of an text image nor white patch of a solid image is generated.

After further effort during intensive studies, the inventors have found out that the above-described problem can be solved by employing an intermediate transfer member in which specific values are indicated by hardness measured by a nano indentation method and hardness specified by universal hardness.

The reason why the above-described problem has been solved is that an excellent transferring ratio is obtained during secondary transfer by hardening the extremely thin surface hardness of the intermediate transfer member, and an excellent toner image, in which neither white patch of an text image nor white patch of a solid image is generated, can be obtained, whereby no cracks and rupture have presumably been generated upon repetitive use by softening the inside softer than the outer surface.

It is a feature in the present invention that employed is an intermediate transfer member comprising a surface having a hardness of 1.5-3.0 GPa, measured by a nano indentation method, and a hardness of 0.15-0.45 GPa, specified by a universal hardness method.

As a layer structure of an intermediate transfer member, it is preferable that a surface layer is provided on a substrate layer. The surface layer preferably contains a precursor material having at least 3 acroyl groups or 3 methacroyl groups in a molecule.

Figure 1:
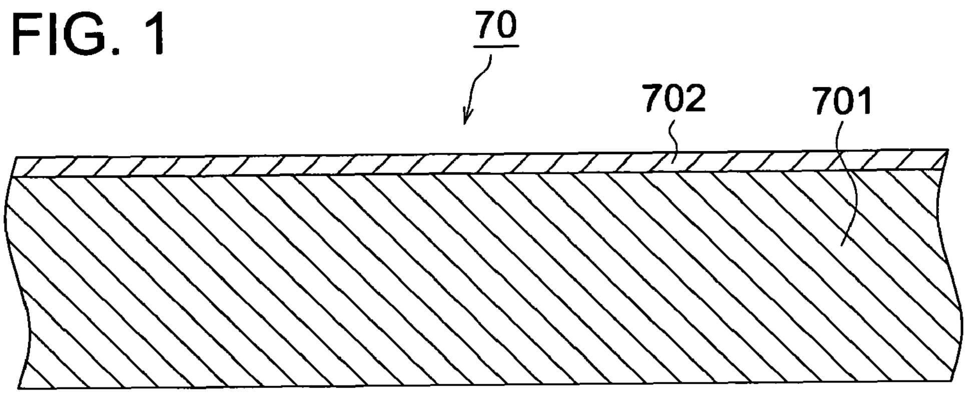
FIG. 1 is a schematic cross-sectional view showing an example of a layer structure of an intermediate transfer member.

FIG. 1 is a schematic cross-sectional view showing an example of a layer structure of an intermediate transfer member.

In FIG. 1, numerals 70, 701 and 702 are designated as an intermediate transfer member, a substrate layer and a surface layer, respectively.

The method of producing an intermediate transfer member of the present invention is preferably a method comprising a step of curing the surface layer via exposure to at least one of heat ray, actinic light and electron beam.

Incidentally, the surface of the present invention means a surface onto which a toner image carried by an electrostatic latent image carrier is transferred. The white patch of a solid image means white patch defects caused by transfer failure into the solid image during solid image formation. The white patch of a text image means transfer defects in the text during printing the text.

First, hardness measured by a nano indentation method and hardness specified by universal hardness will be described.

<<Hardness Measured by Nano Indentation Method>>

In the present invention, hardness of the intermediate transfer member surface, measured by a nano indentation method is 1.5-3.0 GPa, preferably 2.1-2.7 Gpa and more preferably 1.8-2.7 Gpa.

The method of measuring hardness with a nano indentation method is a method of calculating plastic deformation hardness from the value obtained by measuring the relationship between a load and push-in depth (amount of displacement) while pushing a very small diamond indenter into a thin film.

Particularly in the case of a film thickness of at most 1 μm, it is a feature that no crack on the thin film tends to be generated during push-in, together with no dependence on the substrate property. This is generally usable for measuring matter properties of a very thin film.

Figure 2:
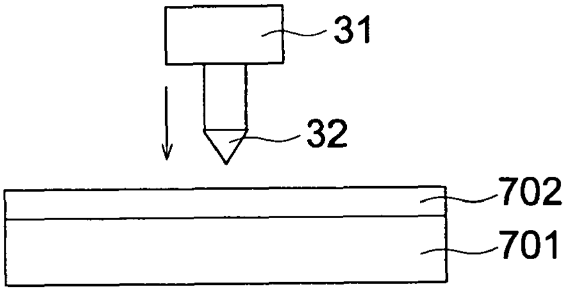
FIG. 2 is a diagram showing an example of a measuring device employing a nano indentation method.

FIG. 2 is a diagram showing an example of a measuring device employing a nano indentation method.

The amount of displacement can be measured to an accuracy of nanometer while applying a load in μN by this measuring device, employing transducer 31 and diamond Berkovich indenter 32 having an equilateral-triangular tip shape. A commercially available "NANO Indenter XP/DCM" MTS NANO Instruments (manufactured by MTS Systems Corporation) is usable for this measurement.

Figure 3:
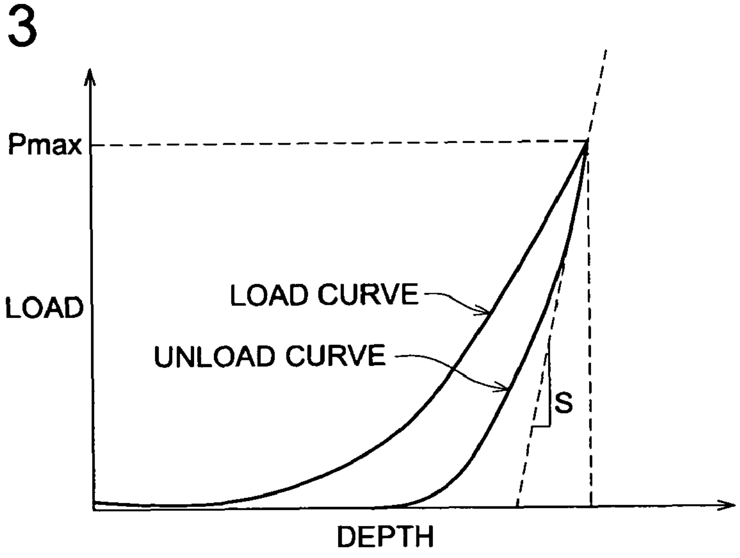
FIG. 3 shows a typical load-displacement curve obtained by a nano indentation method.

FIG. 3 shows a typical load-displacement curve obtained by a nano indentation method.

Figure 4:
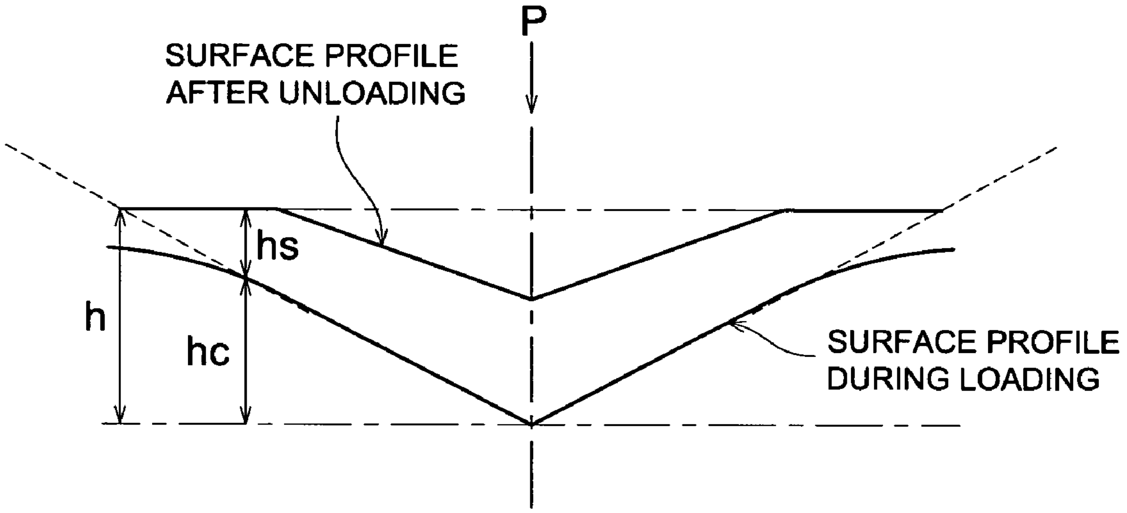
FIG. 4 is a diagram showing a contacting situation between an indenter and a sample.

FIG. 4 is a diagram showing a contacting situation between an indenter and a sample.

Hardness H is determined by following equation (1).

Equation (1) H=Pmax/A, where Pmax is the maximum load applied to an indenter, and A is the contact projection area between the indenter and the sample.

Contact projection area A is expressed by following equation (2), employing hc in FIG. 4.

Equation (2) $A=24.5\ hc^2$, where hc expressed by following equation (3) is shallower than total push-in depth h because of elastic indentation of the periphery surface of a contact point as shown in FIG. 4.

Equation (3) hc=h−hs, where hs indicating an indentation amount caused by elasticity is expressed by following equation (4) using a load curve slope after pushing in an indenter (slope S in FIG. 4) and an indenter shape.

$$hs=\epsilon \times P/S$$

where ε is a constant concerning the indenter shape to be 0.75 in the case of a Berkovich indenter.

Hardness of the surface of surface layer 702 formed on substrate layer 701 can be measured employing such the measuring apparatus.

Measuring Conditions

Measuring instrument: NANO Indenter XP/DCM (manufactured by MTS Systems Corporation)

Measuring indenter: Diamond Berkovich indenter having an equilateral-triangular tip shape Measuring environment: 20° C. and 60% RH Measuring sample: An intermediate transfer member was cut into a size of 5 cm×5 cm to prepare a test sample.

Maximum load setting: 25 μN

Push-in speed: Load was applied in proportion to time at a speed to reach the maximum test load of 25 μN in 5 seconds.

In addition, for all data items, measurement was made at 10 random positions, and the mean value was designated as the hardness obtained via measurement with the nano indentation method.

<<Universal Hardness>>

The universal hardness of an intermediate transfer member in the present invention is 0.15-0.45 GPa, and preferably 0.20-0.40 GPa.

The hardness specified in terms of universal hardness is obtained from following equation (5) when an indenter was pushed into an object to be measured while applying a load to the indenter:

Equation (5) Universal hardness=(Test load)/(contact surface area of an indenter with an object to be measured under test load). This universal hardness can be measured employing a commercially available hardness measuring apparatus. For example, an ultrafine hardness meter "H-100V" (by Fischer Instrument Inc.) is usable for this measurement. In the case of this measuring apparatus, an indenter of quadrangular pyramid or triangular pyramid is pushed into the object to be measured, while a test load is applied thereto. When a predetermined depth has been reached, the surface area of the indenter in contact with the object to be measured is obtained from that depth. The universal hardness is calculated from above-described equation (5).

Measuring Conditions

Measuring instrument: hardness indentation tester "H-100V" (manufactured by Fischer Instrument Inc.)

Measuring indenter: Vickers indenter

Measuring environment: 20° C. and 60% RH

Measuring sample: An intermediate transfer member was cut into a size of 5 cm×5 cm to prepare a test sample.

Maximum test load: 2 mN

Loading conditions: Load was applied in proportion to time at a speed to reach the maximum test load in 10 seconds.

Creep time under load: 5 sec.

In addition, for all data items, measurement was made at 10 random positions, and the mean value was designated as the hardness specified in terms of universal hardness.

The thickness of an intermediate transfer member is determined in accordance with the intended use, but it is preferably 5-500 μm in view of, in general, mechanical properties such as strength and plasticity, more preferably 10-300 μm, and still more preferably 20-200 μm.

Regarding shape of the intermediate transfer member, there is no thickness variation caused by superimposition for the intermediate transfer member having the endless structure. Therefore, an arbitrary portion can be set at a starting position of the belt rotation, so that a control mechanism at the starting position of the rotation can be eliminated.

Next, the layer structure of an intermediate transfer member, the material constitution of a surface layer and the method of preparing an intermediate transfer member will be described.

<<Layer Structure of Intermediate Transfer Member>>

It is preferable that the intermediate transfer member of the present invention has a layer structure in which a surface layer is provided on a substrate layer. This layer structure tends to be capable of obtaining an intermediate transfer member satisfying both plastic deformation hardness measured by the nano indentation method and universal hardness.

An intermediate layer may be provided between a substrate layer and a surface layer, if desired, in order to improve adhesiveness between the substrate layer and the surface layer.

Next, each of layers constituting an intermediate transfer member will be described.

<Substrate Layer>

Substrate layers of the present invention are not particularly limited, and prepared with by a commonly known method employing the commonly known material.

Examples of the commonly known material include a resin material such as polycarbonate, polyphenylene sulfide, polyvinylidene fluoride, polyimide, polyether or ether ketone, and a resin in which polyphenylene sulfide is a major component.

Examples of the commonly known method include a forming method via coating of a coating solution in which a resin is dissolved in a solvent and a forming method via directly depositing a resin to prepare a film. Of these, the latter method is preferable.

Examples of the forming method of directly depositing a resin for preparing a substrate layer include an extrusion method, an inflation method and so forth. The resin is molten and kneaded with a conductive substance to prepare a resin material in both cases. The resin material is extruded and cooled to form the substrate in the case of the extrusion method. In the case of the inflation method, the resin material is molten and formed into a cylinder shape mold, and air is blown into a cylinder shaped resin. The resin is subsequently cooled to be extruded in the form of an endless belt.

Next, a substrate layer made of a resin in which polyphenylene sulfide is a major component, and a method of preparing a substrate layer with an extrusion method will be described.

The substrate layer made of a resin, in which polyphenylene sulfide is a major component, is composed of c, a graft copolymer made of epoxy group-containing olefin copolymer and vinyl based (co)polymer, a conductive filler and a lubricant.

Polyphenylene sulfide (PPS) used in the present invention may be a thermoplastic plastic having a structure alternating a phenylene unit and a sulfur atom.

The phenylene unit is an o-phenylene unit, an m-phenylene unit or a p-phenylene unit, which may contain a substituent group. A preferable phenylene unit contains at least a p-phenylene unit, and the content is at least 50 mol %, based on the total phenylene unit. It is preferable that the phenylene unit is composed only of specifically a non-substituted p-phenylene unit.

Carbon black can be used as a conductive filler usable in the present invention, and neutral carbon black can be used as the carbon black. The conductive filler may be added in such a way that volume resistance and surface resistance of an intermediate transfer member are in the predetermined range, depending on kinds of the employed conductive filler. The amount of the conductive filler is commonly 10-20 parts, and preferably 10-16 parts based on 100 parts of binder resin in the substrate layer.

The lubricant used in the present invention is a substance capable of improving the extrusion processability to an intermediate transfer member, and examples of the lubricant include aliphatic hydrocarbon based wax such as paraffin wax or polyolefin wax; a higher fatty acid such as a lauric acid, a myristic acid, a palmitic acid, a stearic acid or a behenic acid; and a higher fatty acid metal salt such as a sodium salt of the higher fatty acid, a lithium salt of the higher fatty acid or a calcium salt of the higher fatty acid. These lubricants can be used singly or in combination with at least two kinds. The consumption amount of the lubricant is 0.1-0.5 parts, based on 100 parts of polyphenylene sulfide, and preferably 0.1-0.3 parts, based on 100 parts of binder resin.

A ring shaped die is installed in a single-axis extruder, a mixture formed from the above-described material is charged into the extruder, and a molten resin composition is extruded from a seamless belt-shaped discharge opening located at the top of the ring shaped die. The mixture was subsequently introduced outside into a cooling cylinder having a cooling mechanism, and cooled and solidified to be easily extruded in the form of a seamless cylinder.

It is preferable to conduct cooling with water, air, a cooled metal block and such immediately after a belt is discharged from a die as a design to avoid crystallization in this case. A cooling cylinder in which a heat insulating material is placed in a die is employed to draw heat from the belt in this way. Water adjusted to a temperature of at most 30° C. is circulated inside the cooling cylinder. The belt discharged from the cooling cylinder is received in high speed, that is, a cooling rate may be increased via thinned film formation. In this case, the receiving speed is at least 1 m/min., and preferably 2-7 m/min.

When ratio R/d of ring shaped die diameter D to cooling cylinder diameter d is 0.9-1.1, the resin extruded from the ring shaped die to the cooling cylinder is received by the receiving apparatus while introducing outside. In this case, vacuuming the region between the ring shaped die and the cooling cylinder is desired in order to keep the resin moved to the cooling cylinder, when D/d is 0.9-0.98. However, when D/d is 0.99-1.02, the resin can be kept moved to the cooling cylinder without vacuuming the region between the ring shaped die and the cooling cylinder, and it is also of advantage that no vacuuming pulsation is generated, and no layer thickness tends to vary in the receiving direction.

<Surface Layer>

The surface layer of the present invention is not particularly limited, provided that obtained is hardness as specified by hardness measured with the above-described nano indentation method or universal hardness, but examples of the resin to form a preferable surface layer include a thermosetting resin, a UV curable resin and an electron-beam curable resin. Of these, the UV curable resin is preferable.

The UV curable resin can be obtained via exposure to UV radiation, after forming a coated layer containing a precursor material and a polymerization initiator.

The precursor material means a precursor material having at least 3 acroyl groups or 3 methacroyl groups in a molecule. As a specific example, a UV curable acrylic monomer or oligomer is provided.

The following compounds can be provided as a UV curable acrylic monomer or oligomer.

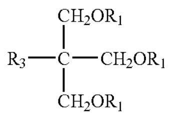

(Number of functional groups: 3)

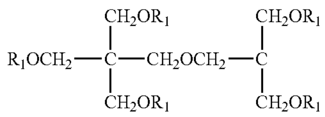

(Number of functional groups: 6)

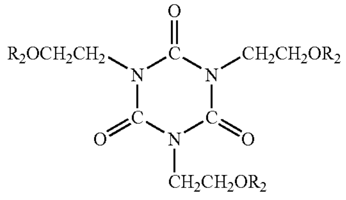

(Number of functional groups: 3)

In these formulae, $R_1$, $R_2$ and $R_3$ each represent a hydrogen atom or an alkyl group, an aryl group, an alkenyl group or an aralkyl group which may have at most 10 hydrogen or carbon atoms and a substituent group.

Examples of specific compounds include pentaerythritol hexaacrylate, urethane acrylate oligomer, dipentaerythritol hexaacrylate, neopentylglycol modified trimethylolpropane diacrylate, and so forth.

Examples of the polymerization initiator for the UV curable resin include benzophenone, Michler's ketone, 1-hydroxycyclohexyl-phenylketone, thioxanthone, benzobutyl ether, acyloxim ester, bisacylphosphine oxide, and so forth.

The surface layer can be formed by adding additives such as a conductive material, inorganic filler, a resistance adjusting agent and so forth, if desired.

As to the surface layer, the hardness as specified by hardness measured with the above-described nano indentation method or universal hardness depends on kinds of utilized UV curable acrylic monomer or oligomer and the composition thereof, kinds and quantity of polymerization initiator, layer thickness, UV curing conditions, kinds and quantity of conductive material, inorganic filler or resistance adjusting agency added if desired, and so forth.

Of these, it depends particularly on kinds of UV curable acrylic monomer or oligomer, and the composition thereof and UV curing conditions.

As a method of forming a surface layer on a substrate layer, preferably provided is a method of curing a UV curable resin via exposure to UV radiation, and further conducting a secondary drying process in order to prescribe an amount of volatile substance in a coated layer, after forming the coated layer by spray-coating a surface layer coating solution onto the substrate layer, and conducting a primary drying process to such an extent that fluidity of the coated layer disappears.

A UV curable acrylic monomer or oligomer, a polymerization initiator, a dilution solvent; and a conductive material, an inorganic filler or a resistance adjusting agency if desired are mixed, and subsequently dispersed employing a sand mill or a stirrer to prepare a spray coating solution.

The dilution solvent is not particularly limited, provided that a UV curable acrylic monomer or oligomer, and a polymerization initiator are dissolved. Examples thereof include n-butylalcohol, isopropylalcohol, ethylalcohol, methyalcohol, methylisobutylketone, methyethyketone, and so forth.

A commonly known apparatus employed for curing the UV curable resin is usable as a UV exposure apparatus.

Figure 6:
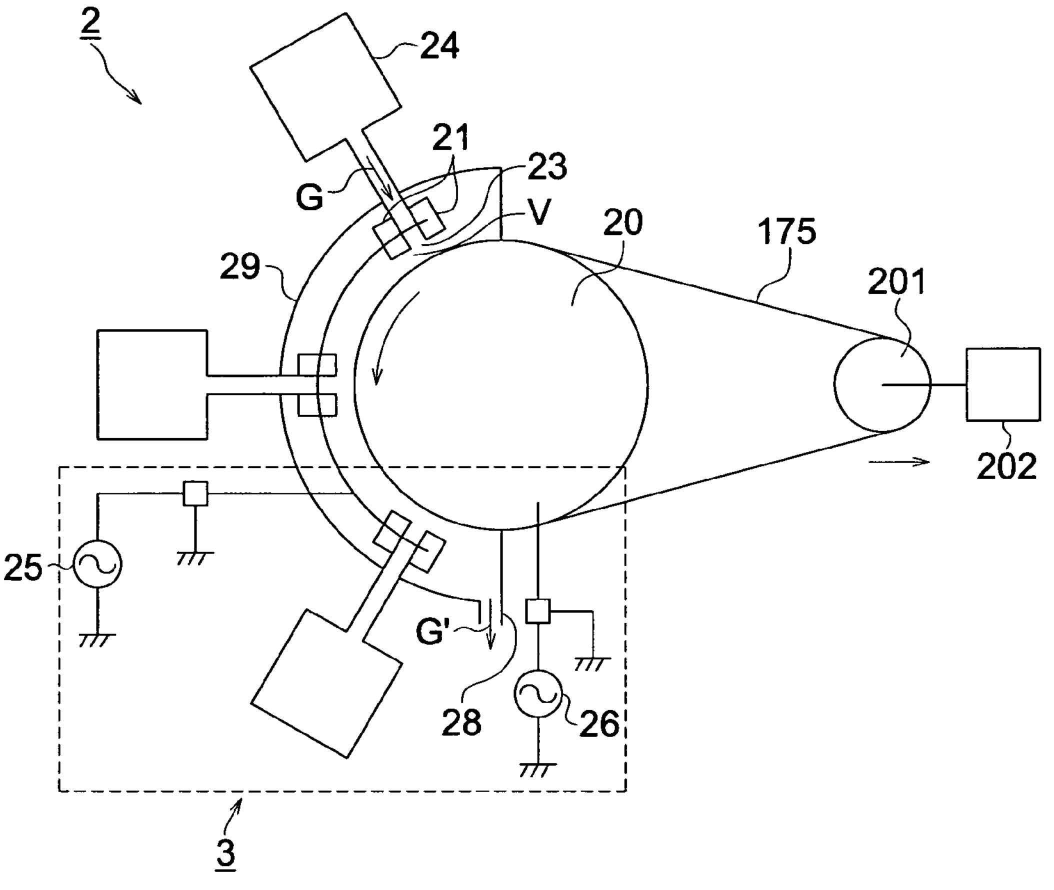
FIG. 6 is a cross-sectional diagram showing a manufacturing apparatus of intermediate transfer members employing an atmospheric pressure plasma CVD method specifically called a direct method in which a discharge space and a thin film deposition region are roughly identical.
Figure 7:
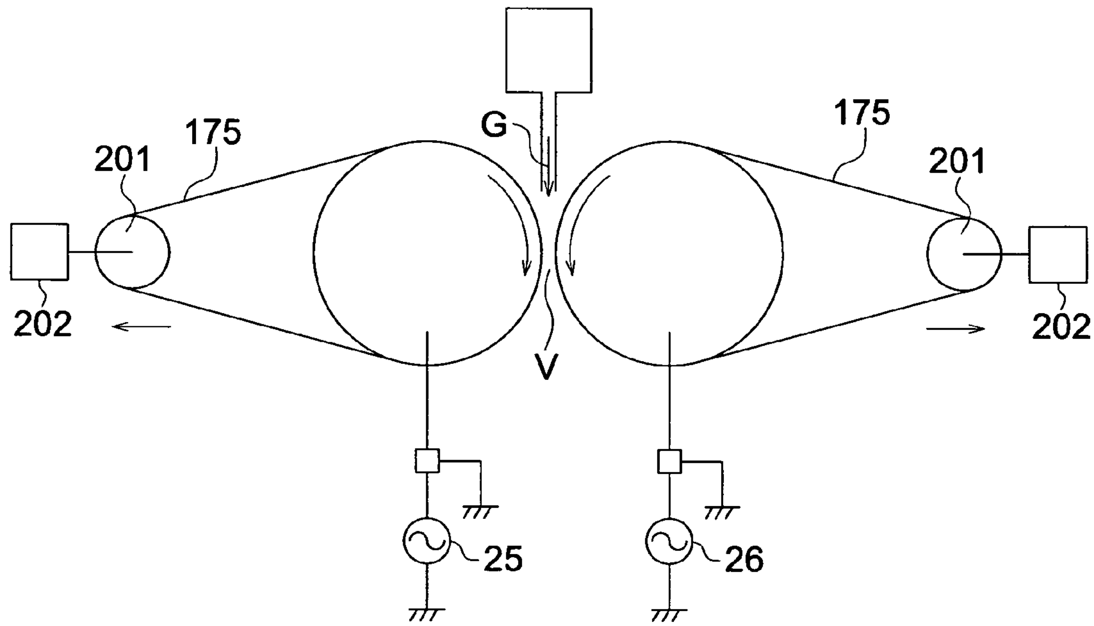
FIG. 7 is a cross-sectional diagram showing another example of a manufacturing apparatus of intermediate transfer members employing an atmospheric pressure plasma CVD method relating to the apparatus shown in FIG. 6.
Figure 8:
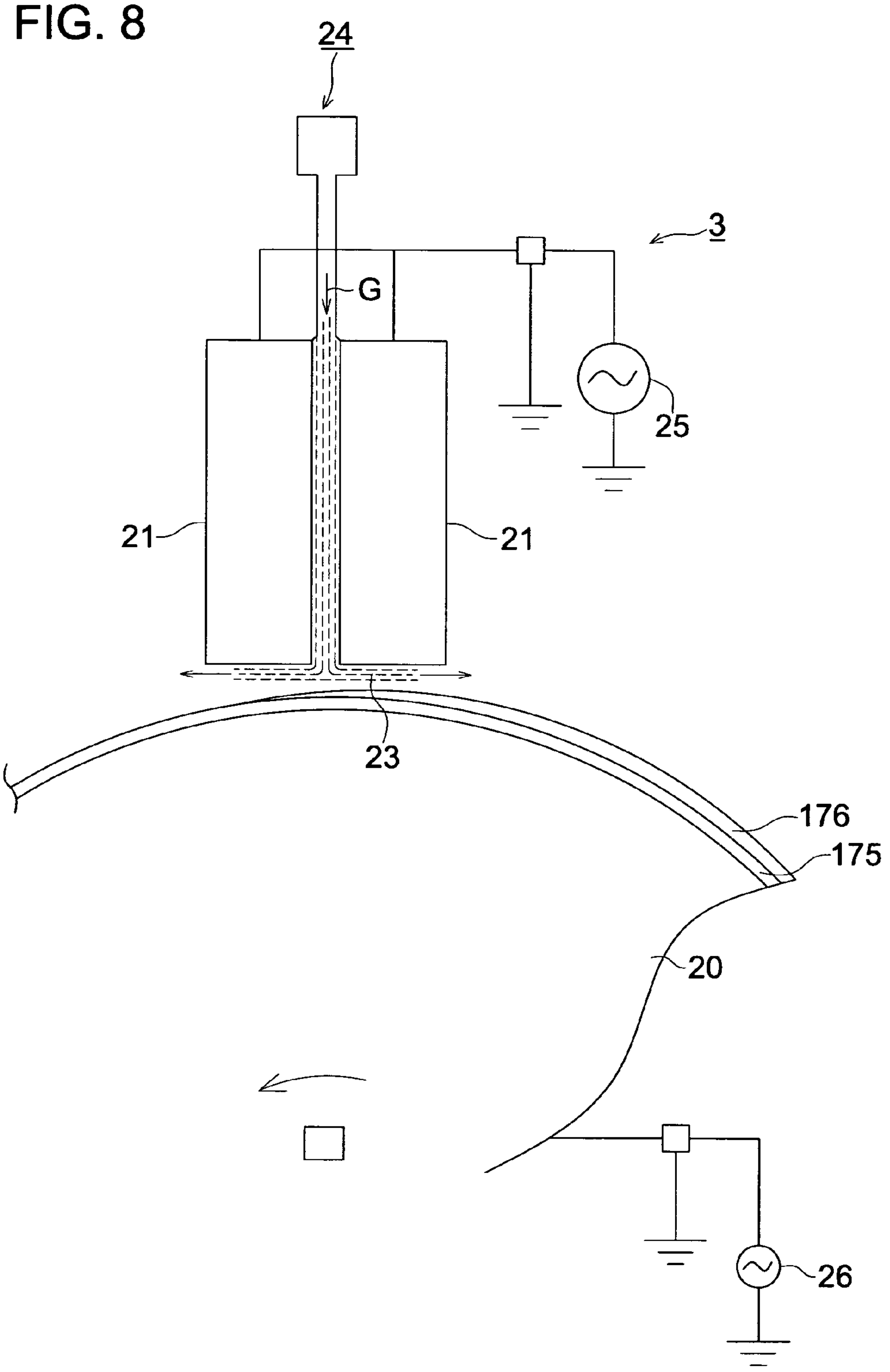
FIG. 8 is an enlarged view showing the manufacturing apparatus of intermediate transfer members shown in FIG. 6.

It is preferable that an amount of UV radiation ($mJ/cm^2$) to cure the resin is controlled with UV exposure intensity and exposure time. The surface layer of the present invention can also be formed employing an atmospheric pressure plasma CVD method described below. Referring to FIGS. 6-8, surface layer 176 is formed on substrate 175 employing manufacturing apparatus 2 of intermediate transfer members (with a direct method in which a discharge space and a thin film deposition region are roughly identical), which is atmospheric pressure plasma CVD apparatus 3 as a film deposition apparatus forming surface layer 176 on roll electrode 20, driven roller 201 and the surface of substrate 175 which rotate in the arrow direction while rolling substrate 175 of intermediate transfer member 170 in the form of an endless belt. Atmospheric pressure plasma CVD apparatus 3 possesses at least one fixed electrode 21 placed along the periphery of roll electrode 20; discharge space 23 being a facing region between fixed electrode 21 and roll electrode 20, in which discharge is generated; mixed gas supply unit 24 introducing mixed gas G into discharge space 23 after producing mixed gas G formed from at least a raw material gas and a discharge gas; discharge vessel 29 to reduce air flowing into discharge space 23; first power supply 25 connected to roll electrode 20; second power supply 26 connected to fixed electrode 21, and evacuation port 28 to evacuate spent gas G'. A gas mixed with a raw material gas which forms at least one layer selected from an inorganic oxide layer, an inorganic nitride layer and an inorganic carbide layer, and an inert gas such as nitrogen gas or argon gas is introduced into discharge space 23 by mixed gas supply unit 24. Driven roller 201 is also pulled by tension providing means 202 in the arrow direction, and a predetermined tension is applied to substrate 175. The applied tension with tension providing means 202 is released during replacement of substrate 175, and it becomes possible to easily replace substrate 175. First power supply 25 outputs a voltage with frequency ω1, and second power supply 26 outputs a voltage with frequency ω2, whereby electric field V superimposing frequency ω1 on frequency ω2 is generated in discharge space 23 by these voltages. A layer (surface layer 176) according to a raw material gas contained in mixed gas G is deposited and formed on the surface of substrate 175 by making the mixed gas in a plasma state with electric field V. Surface layer 176 may also be deposited so as to stack it in piles, employing some of a plurality of fixed electrodes located on the downstream side of the rotative direction of the roll electrode, and the mixed gas supply unit so as to stack it in piles to adjust the thickness of surface layer 176. Surface layer 176 is also deposited employing some of a plurality of fixed electrodes located on the lowest downstream side of the rotative direction of the roll electrode, and other layers such as an adhesive layer and so forth to enhance adhesiveness between surface layer 176 and substrate 175 may be formed employing other fixed electrode and mixed gas supply unit located on the upper stream side. In order to further enhance adhesiveness between surface layer 176 and substrate 175, a plasma treatment may be conducted by providing a gas supply unit to supply argon or oxygen, and a fixed electrode on the upstream side of the fixed electrode and the mixed gas supply unit to form surface layer 176 to activate the surface of substrate 175.

<<Image Formation>>

<Image Forming Apparatus>

Next, an image forming apparatus and an image forming method of the present invention will be described.

It is preferable that the image forming apparatus has on an electrostatic latent image carrier (hereinafter, referred to also as photoreceptor) a charging means, an exposure means, a developing means employing developing agents containing minor diameter toner and a transfer means that transfers a toner image formed by the developing means onto a transfer material through an intermediate transfer member.

Specifically, there are given a copying machine and a laser printer, and especially preferable is an image forming apparatus capable of printing 5000 sheets or more continuously. In the apparatus of this kind, an electric field tends to be generated between an intermediate transfer member and a recording medium because a large number of prints need to be made in a short period of time. However, generation of the electric field is restrained by the intermediate transfer member of the invention, and thereby, stable secondary transfer can be carried out.

An image forming apparatus capable of using the intermediate transfer member of the present invention has therein a photoreceptor on which an electrostatic latent image corresponding to image information is formed, a developing device that develops the electrostatic latent image formed on the photoreceptor, a primary transfer means that transfers a toner image on the photoreceptor onto an intermediate transfer member and a secondary transfer means that transfers a toner image on the intermediate transfer member onto a transfer material such as a sheet of paper or an OHP sheet. Thus, the intermediate transfer member of the present invention makes it possible to conduct stable toner image forming without generating peeling discharge during the secondary transferring.

As an image forming apparatus capable of using the intermediate transfer member of the present invention, there are given a monochrome image forming apparatus that conducts image forming with monochromatic toner, a color image forming apparatus that transfers toner images on a photoreceptor sequentially onto the intermediate transfer member and a tandem type color image forming apparatus in which a plurality of photoreceptors for respective colors are arranged in series.

An intermediate transfer member of the present invention is effective when it is used for a tandem type color image forming.

Figure 5:
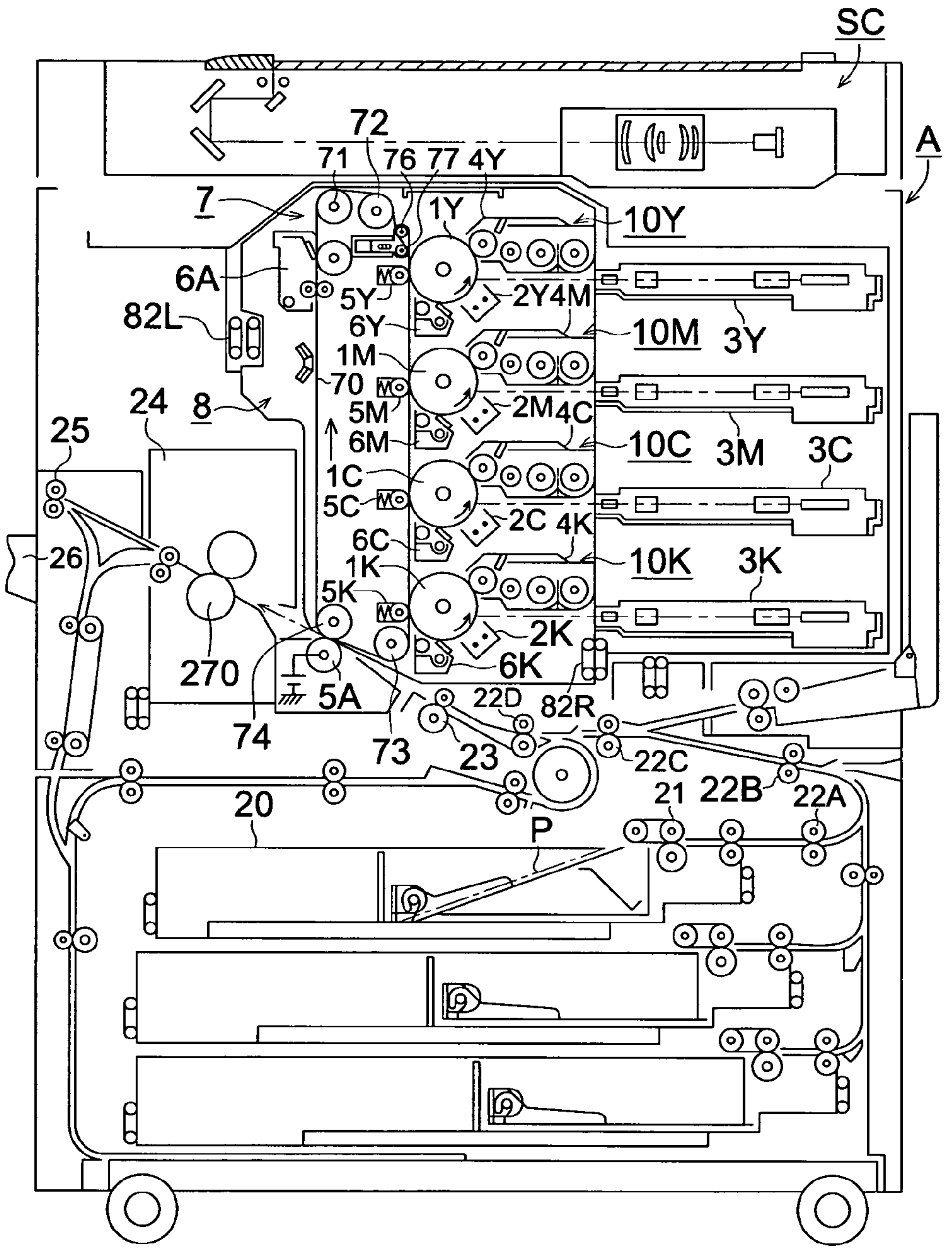
FIG. 5 is a cross-sectional diagram showing an example of an image forming apparatus capable of using an intermediate transfer member of the present invention.

FIG. 5 is a cross-sectional diagram showing an example of an image forming apparatus capable of using an intermediate transfer member of the present invention.

In FIG. 5, each of 1Y, 1M, 1C and 1K is a photoreceptor, each of 4Y, 4M, 4C and 4K is a developing means, each of 5Y, 5M, 5C and 5K is a primary transfer roller representing a primary transfer means, 5A represents a secondary transfer roller representing a secondary transfer means, each of 6Y, 6M, 6C and 6K is a cleaning means, 7 represents an intermediate transfer unit, 24 represents a heat roll type fixing device and 70 represents an intermediate transfer member.

This image forming apparatus is called a tandem type color image forming apparatus, and it has therein plural sets of image forming sections 10Y, 10M, 10C and 10K, endless belt type intermediate transfer unit 7 representing a transfer section, endless belt type sheet feeding conveyance means 21 that conveys recording member P and heat roll type fixing device 24. On the upper part of main body A of the image forming apparatus, there is arranged document image reading device SC.

Image forming sections 10Y that forms an image of a yellow color as one of a toner image in a different color formed on each photoreceptor has therein drum-shaped photoreceptor 1Y as a first photoreceptor, charging means 2Y arranged around photoreceptor 1Y, exposure means 3Y, developing means 4Y, primary transfer roller 5Y as a primary transfer means and cleaning means 6Y. Image forming sections 10M that forms an image of a magenta color as one of a toner image in another different color has therein drum-shaped photoreceptor 1M as a first photoreceptor, charging means 2M arranged around the photoreceptor 1M, exposure means 3M, developing means 4M, primary transfer roller 5M as a primary transfer means and cleaning means 6M. Image forming section 100 that forms an image of a cyan color as one of a toner image in still another different color has therein drum-shaped photoreceptor 10 as a first photoreceptor, charging means 2C arranged around photoreceptor 10, exposure means 3C, developing means 4C, primary transfer roller 5C as a primary transfer means and cleaning means 6C. Further, image forming section 10K that forms an image of a black color as one of a toner image in still more another different color has therein drum-shaped photoreceptor 1K as a first photoreceptor, charging means 2K arranged around photoreceptor 1K, exposure means 3K, developing means 4K, primary transfer roller 5K as a primary transfer means and cleaning means 6K.

Endless belt type intermediate transfer unit 7 has endless belt type intermediate transfer member 70 as a second photoreceptor in the form of an intermediate transfer endless belt, which is rolled by plural rollers, and supported rotatably.

Images each being in a different color formed respectively by image forming sections 10Y, 10M, 10C and 10K are transferred sequentially onto rotating endless belt type intermediate transfer member 70 respectively by primary transfer rollers 5Y, 5M, 5C and 5K, whereby a combined color image is formed. Recording member P such as a sheet as a transfer material loaded in sheet-feeding cassette 20 is fed by sheet-feeding conveyance means 21, to be conveyed to secondary transfer roller 5A as a secondary transfer means through plural intermediate rollers 22A, 22B, 22C and 22D as well as registration roller 23, thus, the color images are transferred all together onto the recording member P. The recording member P onto which the color image has been transferred is fixed by heat roll type fixing device 24, and is interposed by sheet-ejection roller 25 to be placed on sheet-ejection tray 26 located outside the apparatus.

On the other hand, after the color image is transferred by second transfer roller 5A onto recording member P, toner remaining on endless belt type intermediate transfer member 70 is removed from endless belt type intermediate transfer member 70 via curvature separation of recording member P, by cleaning means 6A.

During image forming processing, primary transfer roller 5K is constantly in pressure contact with photoreceptor 1K. Other primary transfer rollers 5Y, 5M and 5C are in pressure contact respectively with corresponding to photoreceptors 1Y, 1M and 1C only in the course of color image forming.

Second transfer roller 5A comes in contact with endless belt type intermediate transfer member 70 only when recording member P passes through second transfer roller 5A and the secondary transfer is carried out.

Enclosure 8 is designed to be drawn out of apparatus main body A through supporting rails 82L and 82R.

Enclosure 8 has therein image forming sections 10Y, 10M, 10C and 10K, as well as endless belt type intermediate transfer unit 7.

Image forming sections 10Y, 10M, 10C and 10K are arranged in tandem in the vertical direction. On the left side of photoreceptors 1Y, 1M, 1C and 1K, there is arranged endless belt type intermediate transfer unit 7. Endless belt type intermediate transfer unit 7 possesses endless belt type intermediate transfer member 70 rotatable via rotation of rollers 71, 72, 73, 74 and 76, primary transfer rollers 5Y, 5M, 5C and 5K, and cleaning means 6A.

When enclosure 8 is drawn out, image forming sections 10Y, 10M, 10C and 10K as well as endless belt type intermediate transfer unit 7 are drawn out all together from main body A.

In this way, a toner image is formed on each of photoreceptors 1Y, 1M, 1C and 1K through charging, exposure and developing, then, toner images having respective colors are superimposed each other on endless belt type intermediate transfer member 70, and they are transferred all together onto recording member P, to be fixed by heat roll type fixing device 24 through application of pressure and heating. Each of photoreceptors 1Y, 1M, 1C and 1K, after the toner image thereon has been transferred onto recording member P, is cleaned by cleaning means 6A to remove remaining toner on the photoreceptor during transferring, and then, the photoreceptors enter the above-described cycle of charging, exposure and developing so that succeeding image forming may be carried out.

<Transfer Material>

A transfer material used in the present invention is a substrate that holds a toner image which is commonly called an image support, a transfer material or a transfer sheet. Specifically, there are given plain paper including thin paper up to thick paper, coated printing paper such as art paper and coated paper, Japanese paper and postcard paper which are on the market, plastic film for OHP and various types of transfer materials such as cloth or the like, but the present invention is not limited thereto.

EXAMPLE

Next, examples of the present invention are described below, but the present invention is not limited to the following examples. In the followings, the term "part by weight" expresses part by weight to the monomer or solid content conversion unless otherwise specified.

<<Preparation of Intermediate Transfer Member>>

<Preparation of Substrate Layer>

| | |
|---|---|
| Polyphenylenesulfide resin "E2180" (produced by Toray Co., Ltd.) | 100 parts by weight |
| Conductive filler "Furnace #3030B" (produced by Mitsubishi Chemical Corp.) | 16 parts by weight |
| Graft copolymer "MODIPER A4400" (produced by Nihon Yushi Co., Ltd.) | 1 part by weight |
| Lubricant (calcium montanate) | 0.2 parts by weight |

The above composition was put into a single-axis extruder, and molten and kneaded to prepare a resin mixture. The resin mixture was extruded into a seamless belt shape through a ring shaped die having a seamless belt-shaped discharge opening attached at the end of the extruder. The extruded seamless belt-shaped resin mixture was introduced into a cooling cylinder provided at the discharge opening, and cooled and solidified to prepare "substrate layer 1" having a seamless cylinder thickness of 150 μm.

| | |
|---|---|
| Acrylic monomer 2: | |
| Dipentaerythritolhexaacrylate "DPHA" (produced by Nihon Kayaku Co., Ltd.) | 70 parts by weight |
| Acrylic monomer 2: | |
| Urethane acrylate oligomer "UX-0937" (produced by Nihon Kayaku Co., Ltd.) | 30 parts by weight |
| Initiator: | |
| 1-hydroxycyclohexyl-phenylketone | 10 parts by weight |
| Conductive particles: | |
| Metal oxide sol "T-1" (produced by Mitsubishi Materials Corp.) | 50 parts by weight |
| n-butyl alcohol | 1200 parts by weight |
| isopropyl alcohol | 300 parts by weight |

The above composition was dissolved and dispersed for 72 hours employing a sand mill to prepare a surface layer coating solution of $1 \times 10^{-2}$ Pa·s.

This surface layer coating solution was spray-coated onto the foregoing "substrate layer", and primary drying was subsequently conducted in a drying device at 80° C. for 1 hour to prepare "surface layer 1" of 5 μm in thickness.

(Formation of Surface Layers 2-9)

"Surface layers 2-9" were formed similarly to formation of "surface layer 1", except that the surface layer compositions were changed as shown in Table 1.

TABLE 1

| Surface layer No. | Surface layer material constitution: Acrylic monomer 1 | Acrylic monomer 2 | Initiator *4 (Parts) | Conductive particle *5 (Parts) | Additive 1 (Parts) | Additive 2 (Parts) | n-butyl-alcohol (Parts) | Isopropyl-alcohol (Parts) |
|---|---|---|---|---|---|---|---|---|
| 1 | *1 70 | *3 30 | 10 | 50 | — | — | 1200 | 300 |
| 4 | *1 50 | *3 50 | 10 | 50 | — | — | 1200 | 300 |
| 5 | *1 80 | *3 20 | 10 | 50 | — | — | 1200 | 300 |
| 6 | *1 30 | *3 70 | 10 | 50 | — | — | 1200 | 300 |
| 7 | *1 90 | *3 10 | 10 | 50 | — | — | 1200 | 300 |
| 2 | *1 70 | *3 30 | 10 | 50 | *6 20 | *8 1 | 1200 | 300 |
| 9 | *1 70 | *3 30 | 10 | 50 | *6 40 | *8 1 | 1200 | 300 |
| 3 | *2 70 | *3 30 | 10 | 50 | *7 20 | *8 1 | 1200 | 300 |
| 8 | *2 70 | *3 30 | 10 | 50 | *7 50 | *8 1 | 1200 | 300 |

*1: Dipentaerythritolhexaacrylate,
*2: Pentaerythritolacrylate
*3: Urethane acrylate oligomer,
*4: 1-hydroxycyclohexyl-phenylketone
*5: Metal oxide sol,
*6: Inorganic filler
*7: PTFE dispersion (a particle diameter of 0.3 μm),
*8: Dimethyl silicone oil <Preparation of Intermediate Transfer Member>

(Preparation of Intermediate Transfer Member 1)

"Surface layer 1" formed via preparation of a surface layer on a substrate layer was exposed to a UV intensity of 200 mW/cm$^2$ employing a high pressure mercury lamp (in which a wavelength of at most 320 nm was cut) for 90 seconds. In this case, a belt was passed through two rollers to rotate at 10 rpm, and UV exposure and secondary drying were conducted to prepare "intermediate transfer member 1".

(Preparation of Intermediate Transfer Members 2-7 and 9-14)

"Intermediate transfer members 2-7 and 9-14" were prepared similarly to preparation of intermediate transfer member 1, except that surface layers and UV intensity and exposure time of the high pressure mercury lamp were changed as shown in Table 2.

(Preparation of Intermediate Transfer Member 8)

Intermediate transfer member 8 was prepared similarly to preparation of intermediate transfer member 1, except that a substrate layer was only used without providing a surface layer.

Surface layers, UV exposure conditions, secondary drying temperature employed to prepare intermediate transfer members, and plastic deformation hardness measured by a nano indentation method and universal hardness of the resulting intermediate transfer members are shown in Table 2.

TABLE 2

| Intermediate transfer member No. | Surface layer: Surface layer No. | UV exposure condition: UV intensity (mW/m$^2$) | UV exposure condition: Exposure time (sec) | Secondary drying temperature (° C.) | Hardness: Plastic deformation hardness with nano indentation method (GPa) | Hardness: Universal hardness (GPa) |
|---|---|---|---|---|---|---|
| 1 | 1 | 200 | 90 | 80 | 2.2 | 0.35 |
| 2 | 1 | 200 | 40 | 80 | 1.8 | 0.33 |
| 3 | 1 | 400 | 180 | 80 | 2.7 | 0.40 |
| 4 | 4 | 200 | 90 | 80 | 1.5 | 0.15 |
| 5 | 5 | 200 | 90 | 80 | 2.5 | 0.45 |
| 6 | 6 | 200 | 90 | 80 | 1.1 | 0.12 |
| 7 | 7 | 200 | 90 | 80 | 3.1 | 0.49 |
| 8 | — | — | — | 80 | 0.8 | 0.14 |
| 9 | 1 | 500 | 300 | 80 | 3.7 | 0.35 |
| 10 | 1 | 200 | 180 | 80 | 2.5 | 0.47 |
| 11 | 2 | 200 | 90 | 80 | 3.0 | 0.44 |
| 12 | 9 | 200 | 90 | 80 | 2.8 | 0.43 |
| 13 | 3 | 200 | 90 | 80 | 2.0 | 0.20 |
| 14 | 8 | 300 | 120 | 80 | 1.5 | 0.24 |

In addition, hardness with the nano indentation method and hardness specified by the universal hardness were measured employing the foregoing measuring method. <<Durability Evaluation>>

<Durability Evaluation with Bending Tester>

A sample (intermediate transfer member) was cut into the size of 10 mm (width)×80 mm (length) according to JIS P-8115 for evaluation with a bending tester. Subsequently, bending was repeated at 20° C. and 60% RH under the conditions of a bending speed of 180 times/min. employing "MIT tester" (produced by Toyo Seisaku-Sho, Ltd.), together with either rotation angle of 90° and a tensile load of 10 N to count times until rupturing, for evaluation.

Evaluation Criteria

B: No rupturing up to 3000 times.

C: Rupturing at the time of less than 3000 times.

<Durability Evaluation with Image Forming Apparatus>

Evaluation with an image forming apparatus was made by counting number of rotations until a crack was generated because of continuous rotation, after "intermediate transfer members 1-9" were installed in order in "8050" (produced by Konica Minolta Business Technologies, Inc.) identical to an image forming apparatus as shown in FIG. 5, and a member directly brought into contact with the intermediate transfer member (developer, cleaning member and the like, for example) was removed. As for evaluation, the image forming apparatus was operated in continuous rotation at 20° C. and 60% RH to visually observe the intermediate transfer member every 50000 rotations.

Evaluation Criteria

A: No crack is observed in an intermediate transfer member up to 200000 rotations.

B: A crack is observed at the end portion of an intermediate transfer member at the time of 150000 rotations.

C: Cracks are observed in the entire intermediate transfer member at the time of 100000 rotations.

<<Evaluation of Secondary Transfer Characteristic>>

"Intermediate transfer members 1-9" were installed in order in "8050" (produced by Konica Minolta Business Technologies, Inc.) to evaluate transferability.

In addition, the toner having a volume-based median particle diameter ($D_{50}$) of 4.5 μm and a double-component developer composed of a coat carrier of 60 μm were employed for image formation.

Printing was carried out at low-temperature and humidity (10° C. and 20% RH) as well as at high-temperature and humidity (33° C. and 80% RH).

An A4 size fine-quality paper sheet (64 g/m$^2$) was employed as a transfer material.

An original image (A4 size) composed of a text image with a pixel rate of 7% (3 points and 5 points), a color portrait photograph image (dot image including half tone), a solid white image and a solid black image, each accounting for ¼ equal part) was used as the print document.

<Secondary Transferring Ratio>

As to a secondary transferring ratio, after completing 10000 prints at low-temperature and humidity (10° C. and 20% RH), a solid image (20 mm×50 mm) with a pixel density of 1.30 was formed to acquire a transferring ratio via the following equation for evaluation.

Transferring ratio (%)=(weight of toner transferred onto a transfer material/weight of toner supplied onto an intermediate transfer member)×100

A: A transferring ratio of at least 90%; Excellent.

B: A transferring ratio of at least 80% and less than 90%; Practically with no problem.

C: A transferring ratio of less than 80%; Practically with a problem.

<Hollow Defects of Text Image>

As to hollow defect evaluation of text images, text images printed at high-temperature and humidity (33° C. and 80% RH) were observed employing a magnifying glass to evaluate generated hollow defects of the text images.

Evaluation Criteria

A: No hollow defect generated up to 10000 prints.

B: No hollow defect generated up to 5000 prints.

C: A hollow defect generated at the time of 1000 prints.

<White Patch of Solid Image Portion>

As to white patch evaluation at a solid image portion, the white patch was determined via how many white patches having a major axis diameter of at least 0.4 mm at a solid image portion printed at high-temperature and humidity (33° C. and 80% RH) are observed on a A4 size paper sheet. In addition, the major axis diameter of a white patch was measured by a microscope equipped with a video printer.

Evaluation Criteria

A: Frequency of white patch having a major axis diameter of at least 0.4 mm: At most 3 white patches in each of the total print images; Excellent.

B: Frequency of white patch having a major axis diameter of at least 0.4 mm: At least 4 and at most 19 white patches generated in at least one image; Practically with no problem.

C: Frequency of white patch having a major axis diameter of at least 0.4 mm: At least 20 white patches generated in at least one image; Practically with a problem.

The evaluated results are shown in Table 3.

TABLE 3

| | | Evaluation of durability | | Evaluation of secondary transfer characteristic | | |
|---|---|---|---|---|---|---|
| | Intermediate transfer member No. | Durability with bending tester | Durability with image forming apparatus | Secondary transferring ratio | White patch of text image | White patch of solid image |
| Example 1 | 1 | B | A | A | A | A |
| Example 2 | 2 | B | A | B | B | A |
| Example 3 | 3 | B | A | A | A | A |

TABLE 3-continued

| | Intermediate transfer member No. | Evaluation of durability: Durability with bending tester | Evaluation of durability: Durability with image forming apparatus | Evaluation of secondary transfer characteristic: Secondary transferring ratio | Evaluation of secondary transfer characteristic: White patch of text image | Evaluation of secondary transfer characteristic: White patch of solid image |
|---|---|---|---|---|---|---|
| Example 4 | 4 | B | A | A | A | A |
| Example 5 | 5 | B | B | A | A | A |
| Example 6 | 11 | B | B | A | A | A |
| Example 7 | 12 | B | B | A | A | A |
| Example 8 | 13 | B | A | B | B | B |
| Example 9 | 14 | B | A | B | B | B |
| Comparative example 1 | 6 | B | B | C | C | C |
| Comparative example 2 | 7 | B | B | C | C | C |
| Comparative example 3 | 8 | C | C | B | B | C |
| Comparative example 4 | 9 | C | C | B | B | B |
| Comparative examples 5 | 10 | C | C | B | B | B |

As is clear from Table 3, it is to be understood that regarding "intermediate transfer members 1-5 and 11-14" of "Examples 1-9", any of properties such as durability with a bending tester, durability with an image forming apparatus, secondary transferring ratio, hollow defects at a text image portion and white patches at a solid image portion are excellent, but each of "intermediate transfer members 6-10" of "Comparative examples 1-5" results in producing a problem for some of the evaluation items. Intermediate transfer members of the comparative examples exhibit clearly different results from those of the present invention.

(Preparation of Intermediate Transfer Members 11-17)

Next, intermediate transfer members in which a surface layer was formed on an intermediate transfer member by a atmospheric pressure CVD method were prepared. One organic compound layer having a thickness of 150 nm as a surface layer was formed on a substrate employing a plasma discharge treatment apparatus as shown in FIG. 6. Silicon oxide was employed for a surface layer. In this case, as to a dielectric to coat each electrode of the plasma discharge treatment apparatus, employed were both electrodes having a coated thickness of alumina on one side which were prepared via ceramic spray processing. The electrode spacing after coating was set to 0.5 mm. Further, a metal base material coating a dielectric material was of a stainless jacket specification having a cooling function with cooling water, and discharging was conducted while controlling electrode temperature with cooling water. As the power supply usable herein, high frequency power supply 80 kHz (produced by Oyo Electric Co., Ltd.) and high frequency power supply 13.56 MHz (produced by Pearl Kogyo Co., Ltd.) were employed. Examples and Comparative examples shown in Tables 4 and 5 were prepared by varying kinds of substrates and film-forming conditions of the surface layers. After vapor is produced by heating each raw material, and is mixed and diluted with a discharge gas and a reactive gas which have been preheated in advance, the resulting was supplied into the discharge space.

(Silicon Oxide Layer)

Discharge gas: $N_2$ gas

Reactive gas: 21% by volume of $O_2$ gas, based on the total gas

Raw material gas: 0.1% by volume of tetraethoxysilane (TEOS), based on the total gas Power supply electric power on the low frequency side: 10 W/cm$^2$ at 50 kHz Power supply electric power on the high frequency side: 1-10 W/cm$^2$ varied at 13.56 MHz

TABLE 4

| | Intermediate transfer member No. | Carbon content in a layer (% by weight) | Surface layer thickness (nm) | Plastic deformation hardness with nano indentation method (GPa) | Universal hardness (GPa) |
|---|---|---|---|---|---|
| Example 10 | 4 | 20 | 300 | 3.0 | 0.16 |
| Example 11 | 14 | 20 | 300 | 3.0 | 0.24 |
| Example 12 | 4 | 25 | 200 | 2.5 | 0.16 |
| Comparative example 6 | 4 | 20 | 300 | 3.1 | 0.16 |

Further, raw material gas was replaced as shown below to similarly prepare intermediate transfer members indicated in Table 5.

Reactive gas: 21% by volume of $O_2$ gas, based on the total gas

Raw material gas: 0.3% by volume of tetrafluorosilane, based on the total gas

Power supply electric power on the low frequency side: 10 W/cm$^2$ at 50 kHz

Power supply electric power on the high frequency side: 1-10 W/cm$^2$ varied at 13.56 MHz

TABLE 5

| | Intermediate transfer member No. | Carbon content in layer (% by weight) | Fluorine content in layer (% by weight) | Surface layer thickness (nm) | Plastic deformation hardness with nano indentation method (GPa) | *1 |
|---|---|---|---|---|---|---|
| Example 13 | 4 | 15 | 5 | 200 | 1.6 | 0.45 |
| Example 14 | 14 | 15 | 5 | 200 | 1.6 | 0.24 |
| Example 15 | 4 | 15 | 5 | 200 | 1.6 | 0.16 |
| Comparative example 7 | 4 | 15 | 5 | 300 | 1.6 | 0.49 |

*1: Universal hardness (GPa)

After forming coated layers of intermediate transfer members 1 and 2, surface layers were formed via electron beam exposure in place of UV exposure to prepare intermediate transfer members 16 and 17, and to measure surface hardness similarly to the case of the foregoing intermediate transfer member. The results are shown in Tables and 6 and 7.

The brief apparatus specification is indicated below. After coating, a curing process was conducted at 60° C. for 20 minutes via electron beam exposure. As the curing conditions of the apparatus, the intermediate transfer member is cured via exposure in the environment filled with $N_2$ gas, together with an acceleration voltage at an electron bean portion of 150 kV, an exposure dose of 100 kGy.

TABLE 6

| | Plastic deformation hardness with nano indentation method (GPa) | Universal hardness (GPa) |
|---|---|---|
| Example 16 | 2.6 | 0.45 |
| Example 17 | 2.0 | 0.44 |

TABLE 7

| | Evaluation of durability | | Evaluation of secondary transfer characteristic | | |
|---|---|---|---|---|---|
| | Durability with bending tester | Durability with image forming apparatus | Secondary transferring ratio | White patch of text image | White patch of solid image |
| Example 10 | B | A | B | B | A |
| Example 11 | B | A | B | B | A |
| Example 12 | B | A | A | A | B |
| Example 13 | B | B | B | B | B |
| Example 14 | B | A | B | B | B |
| Example 15 | B | A | B | B | B |
| Example 16 | B | B | A | A | A |
| Example 17 | B | B | A | A | A |
| Comparative example 6 | B | B | C | C | C |
| Comparative example 7 | B | C | B | B | B |

EFFECT OF THE INVENTION

In the present invention, the intermediate transfer member, the method of producing the same, and the image forming method and the image forming apparatus thereof have excellent effects such that neither crack nor rupture is generated upon repetitive use, no transferring ratio drops during secondary transfer, and neither white patch of an text image nor white patch of a solid image is generated.

What is claimed is:

1. An intermediate transfer member employed in an image forming apparatus which primarily transfers a toner image carried on an electrostatic latent image carrier onto the intermediate transfer member, and secondarily transfers the primarily transferred toner image from the intermediate transfer member to a transfer material, wherein a surface of the intermediate transfer member has a hardness of 1.5-3.0 GPa measured by a nano indentation method, and a hardness of 0.15-0.45 GPa specified by a universal hardness method.

2. The intermediate transfer member of claim 1, comprising a substrate layer and at least one surface layer, wherein a precursor material comprising 3 acroyl groups or 3 methacroyl groups in a molecule is cured to form the at least one surface layer.

3. The intermediate transfer member of claim 2, wherein the surface layer is cured via exposure to at least one of heat ray, actinic light and electron beam.

4. The intermediate transfer member of claim 1, wherein the surface layer is cured via exposure to at least one of heat ray, actinic light and electron beam.

5. The intermediate transfer member of claim 1, comprising the surface layer formed via atmospheric pressure plasma chemical vapor deposition.

6. The intermediate transfer member of claim 1, wherein the surface of the intermediate transfer member has a hardness of 1.8-2.7 GPa measured by a nano indentation method, and a hardness of 0.20-0.45 GPa specified by a universal hardness method.

7. The intermediate transfer member of claim 1, having a thickness of 10 to 300 μm.

8. The intermediate transfer member of claim 1, wherein the substrate layer comprises polyphenylene sulfide.

9. An image forming method, comprising the steps of:

(a) primarily transferring a toner image carried on an electrostatic latent image carrier onto an intermediate transfer member wherein a surface of the intermediate transfer member has a hardness of 1.5-3.0 GPa measured by a nano indentation method, and a hardness of 0.15-0.45 GPa specified by a universal hardness method; and (b) secondarily transferring the primarily transferred toner image from the intermediate transfer to a transfer material.

10. The image forming method of claim 9, wherein the intermediate member comprises a substrate layer and at least one surface layer, and the surface layer is formed by curing a precursor material comprising 3 acroyl groups or 3 methacroyl groups in a molecule.

11. The image forming method of claim 2, wherein the surface layer is cured via exposure to at least one of heat ray, actinic light and electron beam.

12. The image forming method of claim 11, wherein the surface layer formed via atmospheric pressure plasma chemical vapor deposition.

13. An image forming apparatus comprising:

the intermediate transfer member of claim 1;

a primarily transferring device to transfer the toner image carried on the electrostatic latent image carrier onto the intermediate transfer member; and a secondarily transferring device to transfer the primarily transferred toner image from the intermediate transfer member to the transfer material.

14. The image forming apparatus of claim 13, wherein the intermediate transfer member comprises a substrate layer and at least one surface layer, and the surface layer is formed by curing a precursor material comprising 3 acroyl groups or 3 methacroyl groups in a molecule.

15. The image forming apparatus of claim 14, wherein the surface layer is cured via exposure to at least one of heat ray, actinic light and electron beam.

16. The image forming apparatus of claim 13, wherein the surface of the intermediate transfer member has a hardness of 1.8-2.7 GPa measured by a nano indentation method, and a hardness of 0.20-0.45 GPa specified by a universal hardness method.

17. The image forming apparatus of claim 13, wherein the intermediate transfer member has a thickness of 10 to 300 μm.

18. The image forming apparatus of claim 13, wherein the substrate layer comprises polyphenylene sulfide.

* * * * *